US010801377B2

(12) United States Patent
Robert et al.

(10) Patent No.: US 10,801,377 B2
(45) Date of Patent: Oct. 13, 2020

(54) METHOD FOR PROTECTING A ROTATION SEPARATOR FROM ICING AND A ROTATION SEPARATOR

(71) Applicant: Hengst SE, Munster (DE)

(72) Inventors: Stefan Robert, Nordwalde (DE); Martin Rölver, Havixbeck (DE)

(*) Notice: Subject to any disclaimer, the term of this patent is extended or adjusted under 35 U.S.C. 154(b) by 0 days.

(21) Appl. No.: 16/151,378

(22) Filed: Oct. 4, 2018

(65) Prior Publication Data

US 2019/0032529 A1 Jan. 31, 2019

Related U.S. Application Data

(63) Continuation of application No. PCT/EP2017/080557, filed on Nov. 27, 2017.

(30) Foreign Application Priority Data

Dec. 12, 2016 (DE) .................... 10 2016 124 098

(51) Int. Cl.
*F01M 13/04* (2006.01)
*F02D 41/04* (2006.01)
*B04B 5/08* (2006.01)
*B04B 5/12* (2006.01)
*B04B 9/10* (2006.01)

(52) U.S. Cl.
CPC .............. *F01M 13/04* (2013.01); *B04B 5/08* (2013.01); *B04B 5/12* (2013.01); *B04B 9/10* (2013.01); *F02D 41/042* (2013.01); *F01M 2013/0422* (2013.01); *F01M 2013/0455* (2013.01); *F01M 2013/0472* (2013.01); *F02D 2200/023* (2013.01); *F02D 2250/08* (2013.01); *F16N 2200/10* (2013.01); *F16N 2250/08* (2013.01)

(58) Field of Classification Search
CPC ........... F01M 13/04; F01M 2013/0472; F01M 2013/0455; F01M 2013/0422; B04B 9/10; B04B 5/12; B04B 5/08; F02D 41/042; F02D 2250/08; F02D 2200/023; F16N 2250/08; F16N 2200/10
See application file for complete search history.

(56) References Cited

U.S. PATENT DOCUMENTS 6,335,574 B1 * 1/2002 Ochiai .................. B60K 6/48
290/40 C
2013/0167816 A1 * 7/2013 Dawar .................. F02M 25/06
123/573

FOREIGN PATENT DOCUMENTS

| DE | 102009036476 A1 * | 5/2010 | ............ B01D 45/14 |
| EP | 1464797 A2 | 10/2004 | |
| JP | 2010096033 A | 4/2010 | |
| JP | 2013036433 A | 2/2013 | |

* cited by examiner

Primary Examiner — Jacob M Amick
Assistant Examiner — Charles Brauch
(74) Attorney, Agent, or Firm — Jeffrey Joyce, Esq.

(57) ABSTRACT

A method for operating a rotation separator in an internal combustion engine, wherein, after the engine and separator have been switched off, it is determined whether there is a danger of the condensate in the separator freezing to ice because of cold ambient temperatures. If there is danger of ice formation, the separator is started up again by itself, i.e., without the engine being re-started, and is operated at a speed that effectively removes condensate from the rotor of the separator, so as to prevent icing of the separator.

12 Claims, 3 Drawing Sheets

METHOD FOR PROTECTING A ROTATION SEPARATOR FROM ICING AND A ROTATION SEPARATOR

BACKGROUND INFORMATION

Field of the Invention

The invention relates to a method of preventing the icing of a separator used for purifying gas flow. More particularly, the method relates to the prevention of icing in a rotary separator that is used in a combustion engine.

Discussion of the Prior Art

A conventional method is known from EP 1 532 353 B1. The known method is used to purify the gas flow that stems from the crankcase house of an internal combustion engine. The general principle of a centrifugal separator, which can also be constructed as a cyclone, works without rotating parts, but instead, the fluid to be cleaned is set in rotation. A rotary separator, by contrast, is a type of centrifugal separator that has rotating components, i.e., a rotor, and centrifugal plate separators are a type of rotary separator that have a plurality of deposition surfaces, stacked one above the other.

The generic method of operation of the rotary separator in an automobile, for example, is to operate the separator only while the internal combustion engine is turned on. In particular, the generic method is concerned with maintaining a specific gas pressure in the crankcase during operation of the internal combustion engine.

In practice, rotary separators are not only used in industrial facilities, but plate separators especially are also used in automobiles. This means, of course, that the separators are not operated in heated halls, but rather, outdoors. In geographically cold regions i.e., in wintery climates. One of the problems of operating a vehicle in cold climates is that the engine components, including the rotary separator, do not warm up very much, and this is particularly the case when the internal combustion engine has been switched on for just a short period of time, for example, because the automobile has been driven just a short distance. If the gas stream that is guided through the rotary separator contains moist particles, for example, water molecules, then the temperature in the rotary separator may fall below the dew point of the water. If this happens, condensate may form and be deposited on the cold surfaces within the rotary separator.

The temperature in the engine may be below the dew point during operation of the internal combustion engine until the engine has warmed up to the intended operating temperature. In any case, in a wintery climate, the temperature will drop below the dew point in the rotary separator after the engine has been switched off and the automobile is parked outdoors or in an unheated space. The condensate in the separator freezes when it reaches its freezing point, i.e., in the case of water, 0° C. In particular, if the vehicle is driven several short distances in succession, without the engine ever warming up to the intended operating temperature, layers of ice are likely to build up within the rotary separator, which will impede flow through the rotary separator. For example, the ice may completely block the gaps between the individual plates of the plate separator, or the rotor bearings may ice up, so that when the internal combustion engine is re-started, the rotary separator either cannot be set in rotation, or, if rotating, then may run out of round, with the result that the performance of the rotary separator can be partially or completely impaired because the intended flow-through is blocked or impaired.

What is needed, therefore, is a method of preventing an icing of the rotary separator in an internal combustion engine.

BRIEF SUMMARY OF THE INVENTION

It is an object of the invention to provide a method of preventing icing of a rotary separator in an internal combustion engine, as well as a rotary separator that has an electronic control that controls execution of the method. The method according to the invention includes the steps of restarting the rotary separator after the internal combustion engine has been switched off. The method does not apply to the situation in which the rotor continues to run as necessary, with low or decreasing engine speed, after the engine has been switched off. Nor does apply to the situation in which the rotary separator is restarted when the internal combustion engine is restarted. Rather, the method according to the invention foresees restarting the rotary separator after the internal combustion engine has been turned off and remains off. To avoid confusion as to what is meant when reference is made to restarting the rotary separator, the restart of the separator according to the invention is referred hereinafter as a "solo start."

In the solo start according to the invention, the rotor is accelerated to its effective speed, i.e., a speed that ensures that the particle deposits on the rotor are spun or flung off the rotor. This speed, therefore, may deviate from the speed at which the rotary separator operates when the internal combustion engine is running. The solo start reliably avoids an out-of-round operating condition due to ice build up on the rotor, an operating condition which would otherwise have a negative effect, should the rotary separator be re-started when the engine is running, because of the high rotational speed of the rotor during normal vehicle operating conditions. In addition, the solo start ensures that condensate is reliably flung, i.e., removed, from the rotor, eliminating the risk that the spaces between the plates of a plate separator are blocked or completely closed off by ice and impermeable to the flow of gas.

Advantageously, such a solo start-up may be initiated at a predetermined period of time after the internal combustion engine has been turned off. This is a particularly simple way of triggering the solo start of the rotary separator, because, apart from a time signal which is normally available in the vehicle, no further sensor signals need to be evaluated.

As an alternative or in addition to using a time control, a temperature control may also be used. In this case, the solo start may be triggered when the temperature has fallen to a specific temperature. Temperature sensors are typically alreay provided on vehicles, in an area near the rotary separator or as an external thermometer, and their values may be evaluated in a central engine control system. It is therefore possible, with little control engineering effort, to initiate the solo start, based on a detected temperature, for example, a temperature has to the dew point or below it, and before icing begins, so that any condensate that has formed is reliably removed before ice has formed.

The temperature value that is selected to initiate the solo start depends on where the respective temperature sensor is located. Optionally, the temperature is detected directly on the rotary separator, preferably on a housing which surrounds the rotor, should this housing represent the coldest surface that comes into contact with the interior of the rotary separator during the cool down. If, however, the temperature is evaluated elsewhere, i.e., remotely from the separator, then it may be desireable to calculate a correction factor and then to determine the appropriate temperature value for initiating the solo start.

Apart from the just temperature value, the change in temperature over time may also be detected, i.e., a temperature gradient may be determined. Depending on the cooling rate, then, a temperature value is selected that ensures that the solo start is initiated before there is a risk of icing.

The method according to the invention also foresees that a solo start is carried out not just a single time after switching off the internal combustion engine, but rather, at intervals several times in succession. This increases the likeihood that all condensate is actually removed from the rotor. Condensate may penetrate into a bearing and any frictional heat that arises in the region of the rotor bearings due to the solo start also supports the outflow of condensate, and, due to this generated heat, the window of time before ice forms may advantageously be increased.

If ice has already have started to form, then thin sheets of ice form and float on a liquid film on the rotor. Starting up the rotor in this early stage of ice formation has the advantage that the rotational motion of the rotor causes these sheets of ice to be spun off and any motion in the bearings causes ice formed there to be broken up. These multiple solo starts reliably eliminate the risk that the rotary separator freezes to the extent, that, when restarting the internal combustion engine, the rotor is frozen tight and cannot rotate. For this reason, the method according to the invention also foresees that a solo start is carried out even then, when a temperature is detected that has reached the freezing point or even fallen below it.

The rotor may advantageously be electrically rotationally driven. This has the obvious advantage that the rotor may be driven after the internal combustion engine has been shut off, but is also has another advantage: The electric drive of the rotary separator may, if necessary, be controlled in such a way that it intentionally is operated with a poor efficiency and that the power loss in the drive is dissipated in the form of heat. This heat then counteracts premature cooling of the rotary separator, so that the window of time to when the freezing point is reached is widened, thereby allowing the accumulating condensate to be reliably removed in liquid form.

Alternatively, the rotor may also be driven hydraulically, if, for example, a hydraulic pressure accumulator is already available in the respective vehicle.

Advantageously, the solo start routine may be terminated after a maximum time after the engine has been shut off, so that further solo starts are suppressed. This limits the amount of quiescent current that is used, i.e., the amount of electrical energy that is drawn from an energy storage device that does not charge when the internal combustion engine is shut off. For example, a generator that is coupled to the internal combustion engine does not charge when the engine is shut off. As an alternative to terminating the routine based on the maximum period of time, a maximum number of solo starts after an engine stop may be used to determine when the solo start routine is to be terminated.

The solo starts may be suppressed by simply not evaluating the temperature values after this maximum time, or by not letting the control trigger a corresponding start signal despite evaluation of the limit conditions required for the solo start—such as for example, the temperature values—after this maximum time. It is particularly energy-saving and therefore particularly advantageous that the entire control system switch to a sleep mode in which no further detection or calculation of values is carried out.

BRIEF DESCRIPTION OF THE DRAWINGS

An exemplary embodiment of the present invention is described with reference to the accompanying drawings.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
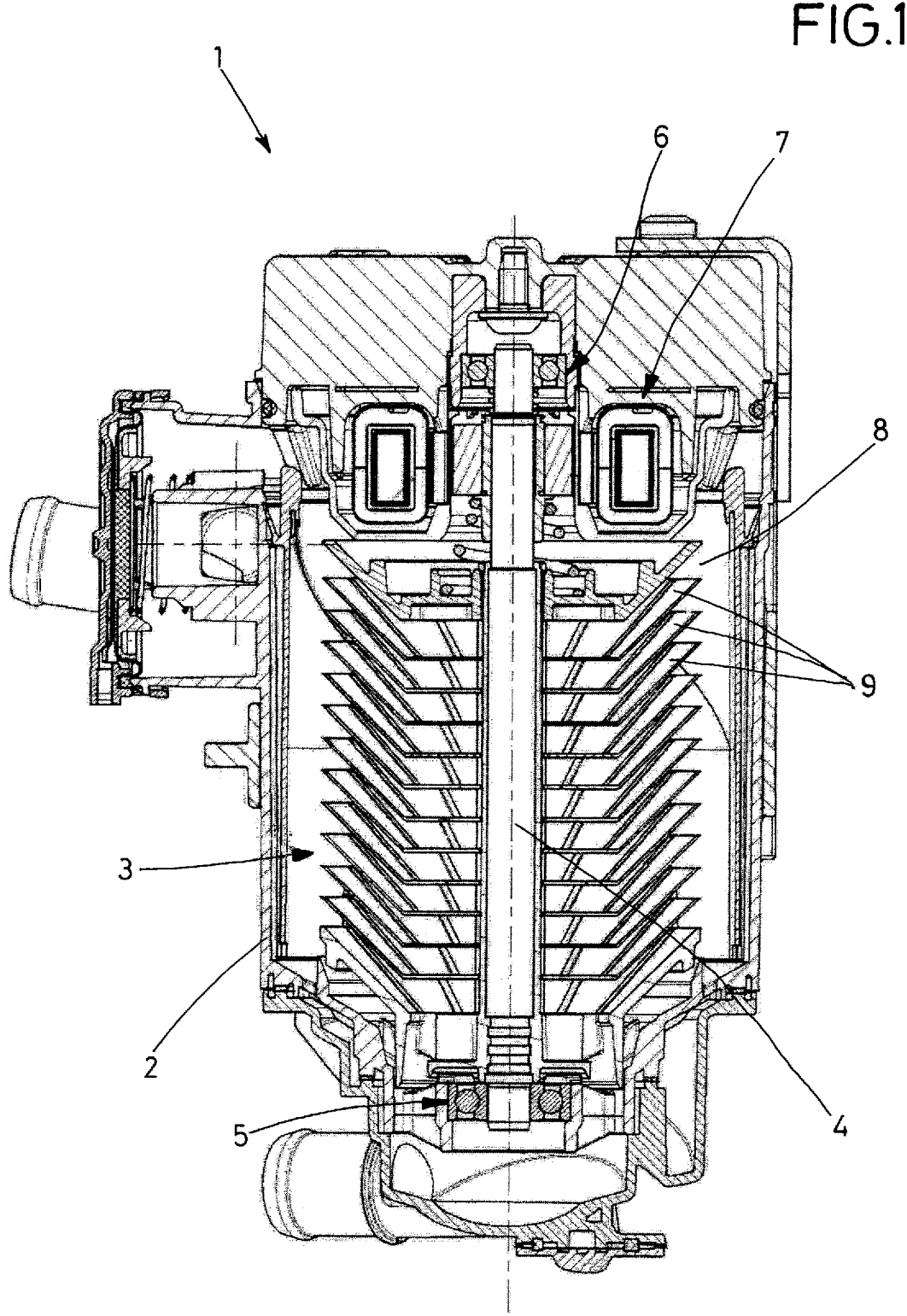
FIG. 1 is a vertical cross-sectional view of the rotary separator.

FIG. 1 illustrates a rotary separator 1 that is used in an internal combustion engine to purify the gas flow in the engine crankcase. In the embodiment shown, the rotary separator 1 is what is referred to as a centrifugal plate separator, a conical plate separator, or a disc separator. Reference is made hereinafter to a plate separator as the exemplary embodiment of the rotary separator 1, but it is understood that the present invention is not limited to this particular embodiment of the rotary separator.

The rotary separator 1 has a housing 2 in which a rotor 3 is rotatably mounted on and driven by a vertical spindle 4. The rotor 3 has a plurality of trough-shaped plates 9 that serve as separation surfaces. The spindle 4 is supported in a lower foot bearing 5 and an upper head bearing 6. An electric drive unit 7 is mounted beneath the head bearing 6, directly adjoins an interior space 8 that surrounds the rotor 3, and has a coil that extends concentrically about the spindle 4.

Between the plates 9 are flat intermediate spaces. These spaces may be reduced, for example, to a dimension of less than 0.5 mm. Gaps with small cross-sectional dimensions serve as a seal between the unfiltered side and the filtered side and are referred to as gap seals. It cannot be ruled out that the foot bearing 5 is not completely sealed off. Because of that, possibly supported by gravity or capillary forces, the ingress of condensate into the gaps and intermediate spaces and also into the foot bearing 5 is possible.

Figure 2:
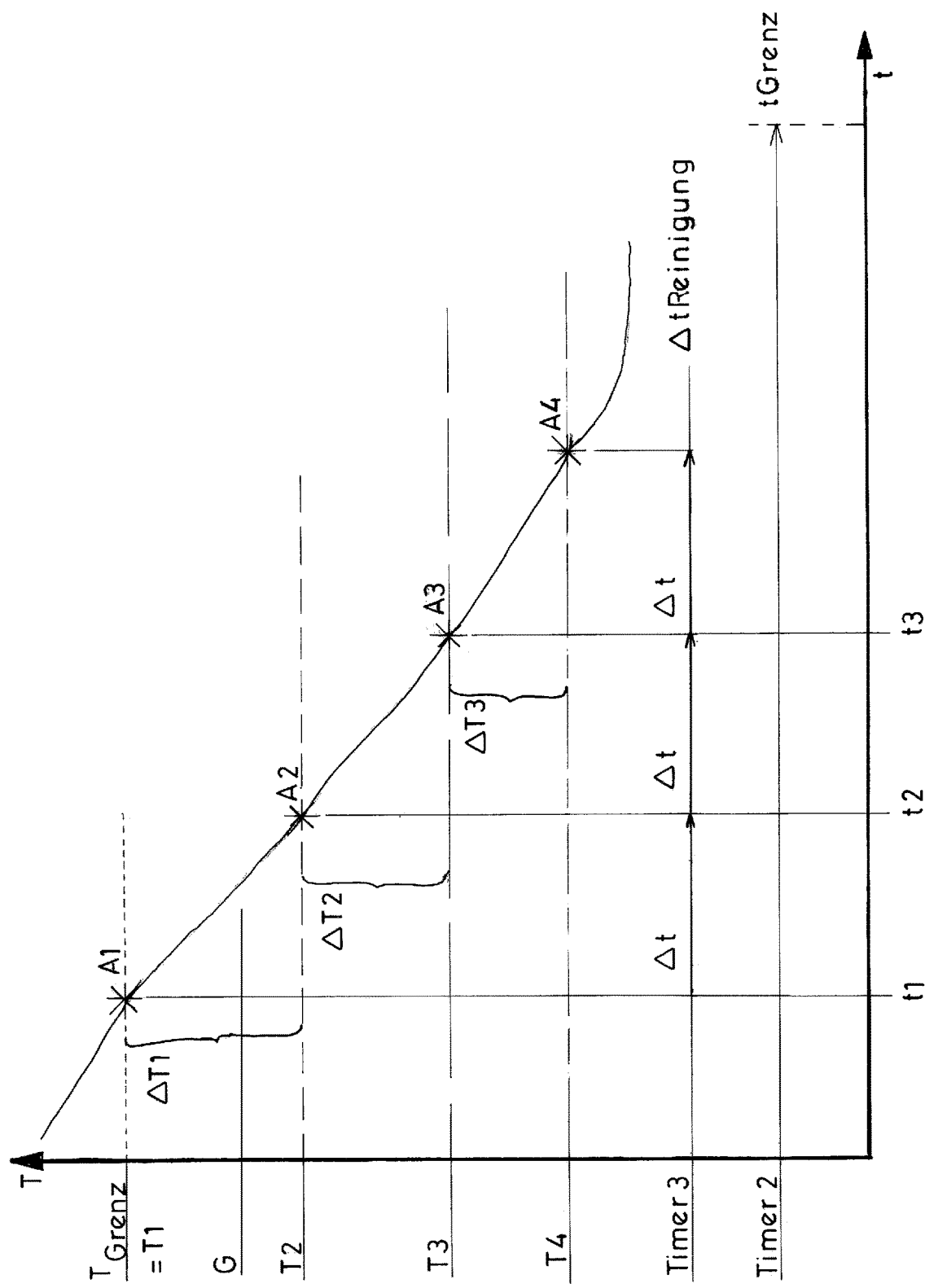
FIG. 2 is a temperature/time diagram after an ice-prevention/elimination routine has commenced, illustrating initiation and operating times of solo starts of the rotary separator.

FIG. 2 is a graph that illustrates the trigger points for initiating one or more solo starts according to the invention, the purpose of the solo starts being to prevent icing on the rotor and in the rotor bearings. The graph plots the change in temperature T over time t after the internal combustion engine has been switched off. The horizontal axis represents the time line T and the vertical axis the temperature T. The temperature T is detected on the rotary separator 1 or at some distance removed therefrom. For the sake of simplicity, regardless of where the temperature T for the solo start routine is detected, reference to temperature on the rotor refers to this temperature T.

Initially, the temperature at the rotary separator 1 is the prevailing temperature during operation of the internal combustion engine. As soon as the engine is switched off, the rotary separator 1 begins to cool down. With the method according to the invention, a first timer is started when the internal combustion engine is shut off. These two events, i.e., switching off the engine and starting the first timer, lie outside of the window of time shown in FIG. 2. The graph shows only a cooling curve that is already advanced to the point where protection against icing on the rotor 1 becomes relevant.

In the method according to the invention, a limit temperature TLimit is stored in the controller that controls the operation of the rotary separator 1. When the temperature on the rotor 1 cools to the limit temperature TLimit, this indicates that the rotor temperature has fallen below a dew point and that condensate is now being deposited on the cool surfaces of the rotary separator 1 that border on or are connected with the interior 8 of the rotor 1. In other words, condensate is likely beginning to form on the rotor housing 2 as well as on the rotor plates 9.

The solo start method according to the invention serves to remove condensate from the surfaces of the rotor 1, preferably before the condensate ices. Upon reaching the limit temperature TLimit, a second timer Timer 2 is started, which specifies a maximum window of time up to a time limit tLimit and within which one or more solo starts A of the rotary separator 1 are carried out. The solo starts are referred to generally as A and specific solo starts as A1, A2, A3, etc. A third timer Timer 3 is also started when the limit temperature TLimit has been reached. This Timer 3 runs for a certain period of time $\Delta t$, which is shorter than the time period set by the second timer Timer 2. A first solo start A1 of the rotary separator 1 is also initiated when the temperature drops to the limit temperature TLimit, This is indicated in FIG. 2 by an asterisk (*) on the cooling curve. Because it is the first solo start, it is labeled A1. Following the same logic, the limit temperature TLimit can also be referred to as the temperature T1, because the first solo start A occurs this temperature T1. The point of time when the limit temperature TLimit/T1 is reached is thus referred to as t1. The time during which a solo start is executed is referred to as a cleaning time. This cleaning period, which is shorter than the time period $\Delta t$ that is associated with the third timer Timer 3, is designated $\Delta t$Cleaning and controlled by a fourth timer Timer 4. As shown in FIG. 2, the cleaning period $\Delta t$Cleaning is initiated commensurate with the beginning of each time period $\Delta t$ and carried out for only a short period of time within the respective $\Delta t$ time period.

Sometime during the period defined by Timer 3, the cooling curve in the illustrated embodiment indicates that the rotor temperature has fallen below the freezing temperature G, in this case, 0° C. After Timer 3 has timed out, thus, at the end of the first time period t1/$\Delta t$, a second solo start A2 of the rotary separator 1 is initiated at a temperature T2 and at a time t2. At the same time, the Timer 3 is zeroed out and restarted, so that after the second time period t2/$\Delta t$ has lapsed, a third solo start A3 is initiated at a temperature T3 and at a time t3. This process is continued with the solo start A4 and further solo starts, as are needed to prevent icing. In each time period $\Delta t$, the cleaning period $\Delta t$Cleaning is executed, whereby the rotor 1 is set in rotation. The solo starts A are thus repeatedly initiated until the Timer T2 has timed out and the limit time tLimit has been reached.

With each solo start A, the rotor 3 is accelerated to its effective speed $n_{Effective}$, so that the rotor 3 is effectively cleaned, i.e., the condensate on the plates 9 is spun off the rotor 3. This condensate can now flow downward, along with the condensate that has formed on the inner surface of the housing 2, and be drained from the interior 8 of the rotary separator 1 via the drainage path that is provided.

In the method sequence shown in FIG. 2, the solo starts A, after reaching the limit temperature TLimit/T1, are always triggered after a certain time interval $\Delta t$. The cooling curve is not linear and, consequently, the time intervals $\Delta t$ are always equal in length, but the respective temperature intervals $\Delta T$ that are associated with each of the solo starts A vary in magnitude: initially the first temperature interval from the limit temperature TLimit or T1, or from the first solo start A1 to the second solo start A2 and its associated temperature T2, is comparatively large. Due to the flattening out of the cooling curve, the subsequent temperature intervals $\Delta T2$ and $\Delta T3$, and at any further temperature intervals $\Delta T$ that may be required until the time point tLimit is reached, will always be smaller than the interval that just precedes it.

Notwithstanding the sequence shown in FIG. 2, it it also possible that predetermined time intervals $\Delta t$ are not used to initiate solo starts A, but instead, predetermined temperature intervals $\Delta T$ are used. This ensures that a "cleanable" amount of condensate has formed on the rotor 3. In this case, the time intervals $\Delta t$ may vary from one solo start A to the next one.

Alternatively to the series of events illustrated in FIG. 2, it is possible that the initiation point for a solo start A not be rigidly fixed as an exclusively time-dependent event or an exclusively temperature-dependent event, but that limit values for a maximum permissible time interval $\Delta t$max and a maximum permissible temperature interval $\Delta T$max be provided, each of which is not to be exceeded. This allows a flexible initiation of a solo start A, which is then initiated as a function of whether such a time interval $\Delta t$max or such a temperature interval $\Delta T$max has been reached.

In addition, the progression of the cooling curve may be determined by detecting certain temperature/time coordinate pairs. For example, the prevailing temperature may be detected at any time during a solo start A. The cooling rate may then be determined based on the comparison of such pairs of coordinates, i.e., on a temperature gradient dT. This temperature gradient dT becomes smaller and smaller as the cooling curve approaches its limit and flattens out. Given this, it is desirable to control the solo start routine so that no solo starts A more are triggered when the temperature gradient is below a lower limit dTLimit, because presumably no appreciable amount of condensate has formed on the rotor 3.

If the temperature curve does not fall steadily as a cooling curve, but instead, the temperature rises, for example, due to the onset of solar radiation, there will be no further condensate. When determining the temperature gradient dT, therefore, it is possible to take into consideration whether the temperature gradient is negative, i.e., the temperature is continuing to fall, or whether the temperature gradient is positive, i.e., the temperature is rising. In the case of a positive temperature gradient dT, then no more solo starts A are carried out. This is advantageous, because is limits the quiescent current and saves energy.

FIG. 2 shows a time limit value tLimit, which is determined by the Timer 2. After Timer 2 has timed out, no further solo starts A are triggered, but rather are suppressed. This measure, too, serves to limit the quiescent current and to limit drawing electrical energy from a reservoir of stored energy.

Figure 3:
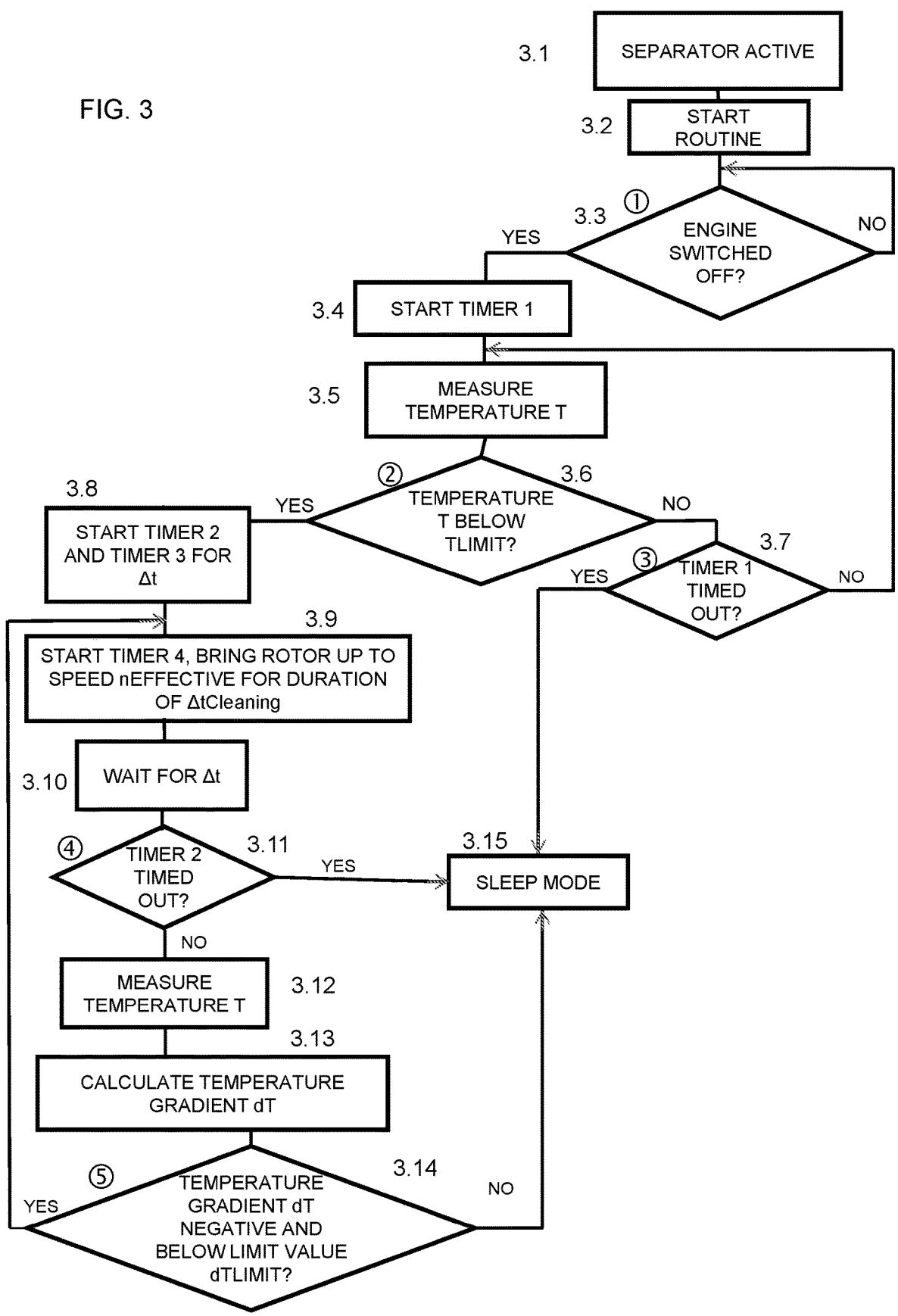
FIG. 3 is a flowchart that illustrates the queries of the control routing for triggering solo starts of the rotary separator.

FIG. 3 is a flowchart that illustrates one of several methods of controlling the rotary separator 1 according to the inventive method. According to flowchart conventions, processes/events are indicated in rectangular boxes and queries/decisions are indicated in diamonds (rhombi). The method assumes that the rotary separator 1 is associated with an internal combustion engine of a motor vehicle. As soon as an electronic control of the motor vehicle is turned on, for example, by switching on the ignition, the rotary separator 1 is activated, as well as the control routine that is explained step by step below.

Step 3.1: The separator is active.

Step 3.2: The routine is initiated.

Step 3.3: Query (1) of the solo start routine checks if the internal combustion engine is switched off. If no, this query is repeated regularly as long as the engine is running. If yes, i.e., the engine is not running, the solo-start routine goes to Step 3.4.

Step 3.4: Timer 1 is started. This Timer 1 determines a period of time during which the control routine is carried out. Should this time period be exceeded, for example, because the temperature does not fall to the limit temperature TLimit during the time period of the Timer 1, then no solo start A is carried out until the combustion engine is started again and then shut off again. Instead, the controller goes to 3.15, SLEEP MODE.

Step 3.5: When Timer 1 is started, temperature T is also measured. Starting from a first temperature value at the beginning of the temperature detection, the temperature will typically continue to fall.

Step 3.6: Query (2) checks whether the temperature T reaches or falls below the specified value of the limit temperature TLimit that was described in FIG. 2. If no, the routine goes to Step 3.7, and if yes, to Step 3.8.

Step 3.7: Query 3 checks whether the Timer 1 has timed out or not. If no, the routine loops back to Step 3.5, where it again checks the temperature T. If yes, the routine goes to Step 3.15, SLEEP MODE.

Step 3.8: Timer 2 and Timer 3 are started. Timer 2 sets a time period tLimit from start through to termination of the solo starts. Timer 3 sets the time period for Δt, i.e., the time period between initiations of any two solo starts A1-A2, A2-A3, etc. The duration of the time limit tLimit that is determined by the Timer 2 spans at least the length of time required for multiple solos starts, i.e., spans multiple time periods Δt that are set by the Timer 3, so that several solo starts A can be carried out. The limit time tLimit serves to enable the implementation of a meaningful number of solo starts A, even then, when, for example, the limit temperature TLimit, which leads to execution of the first solo start A1, is reached comparatively late, for example, shortly before the time specified by the Timer 1 times out. After the limit temperature TLimit is reached and the first solo start A2 is carried out, the routine no longer monitors the Timer 1; rather, the Timer 2 now determines the time frame within which the solo start routine continues to run.

Step 3.9: Timer 4 is started, the rotor 3 is brought up to its effective speed $n_{Effective}$ for the duration of the time period ΔtCleaning. Timer 4 controls the period of time for cleaning, ΔtCleaning, during which the rotor 3 of the rotary separator 1 is brought up to a speed that is effective in flinging condensate from the rotor 3. This cleaning time ΔtCleaning is shorter than the time period Δt.

Step 3.10: The routine awaits the conclusion of Δt.

Step 3.11: Query 4 checks whether the Timer 2 has timed out. If yes, the routine goes to Step 3.15, SLEEP MODE. If no, the routine proceeds to Step 3.12.

Step 3.12: The Temperature T is detected.

Step 3.13: The temperature gradient dT is calculated according to the equation:

$$dT=(T(tn+1)-T(tn))/((tn+1)-(tn)),$$

whereby here n does not refer to the speed of the rotor that is designated nEffective, but rather, represents the ordinal numbers of the individual detected temperatures or times.

Step 3.14: Query 5 checks whether the temperature gradient dT is negative and below the limit value dTLimit. If no, the routine goes to Step 3.15, SLEEP MODE. If yes, the routine loops back to Step 3.9, where the Timer 4 is started, the rotor 3 brought up to effective speed for the duration of the timer period ΔtCleaning. A negative temperature gradient dT is the expression of a falling temperature. If the temperature gradient dT lies above a defined limit value dTLimit, i.e., is sufficiently steep, that is an indication that the temperature is still falling rapidly. If, on the other hand, the temperature gradient dT is below the limit value dTLimit, this is an indication that the cooling curve is now so flat that no further condensation is expected to form and, therefore, a solo start A is suppressed.

In query (5), the two conditions "negative temperature gradient dT" and "dT>dTLimit" are linked to one another by a logical AND function. A new solo start A is initiated only if both conditions are given, i.e., the solo start routine is carried out in a loop, whereby the rotor 3 is brought up again to its effective rotational speed nEffective for the cleaning time period ΔtCleaning. In this case, the timers Timer 3 and the Timer 4 are restarted and the time period ΔT again times out before the routine loops back to Step 3.9 and Query (4).

Step 3.15: SLEEP MODE. In this mode, the routine is terminated, i.e., no further solo starts A are carried out.

It is understood that the embodiments described herein are merely illustrative of the present invention. Variations in the a control routine for solo starts of a rotary separator may be contemplated by one skilled in the art without limiting the intended scope of the invention herein disclosed and as defined by the following claims.

What is claimed is:

1. A method for preventing icing of a rotary separator that is used in an internal combustion engine, the method comprising the following steps:
   a) checking if the engine is switched off and if no, repeating this query at intervals until the response is yes;
   b) initiating a solo start of the rotary separator that brings a rotor to a speed that effectively removes condensate from the rotor;
   c) specifying a time limit for initiating one or more solo starts after the engine is switched off; and
   d) suppressing solo starts after the time limit is reached.

2. The method of claim 1 further comprising the step of:
   e) waiting a period of time after the engine is switched off before initiating the solo start.

3. The method of claim 1 further comprising the stop steps of:
   f) specifying a limit temperature for initiating a first solo start;
   g) detecting a temperature at or near the rotary separator; and
   h) initiating the first solo start if the temperature has fallen to the limit temperature.

4. The method of claim 1, further comprising the steps of:
   i) determining a temperature gradient that indicates how fast or how slow the temperature is falling; and
   j) initiating a subsequent solo start, based on the temperature gradient.

5. The method of claim 1, further comprising the step of:
   k) initiating a series of successive solo starts.

6. The method of claim 1, further comprising the step of:
l) determining whether the temperature has reached or fallen below a freezing point and, if yes, initiating the solo start.

7. The method of claim 1, wherein the rotor is rotationally driven by means of an electric drive unit.

8. The method of claim 7, wherein the electric drive unit is operated such, that heat output from the unit is greater than a normal heat output of the unit when the rotor is driven.

9. The method of claim 1, wherein the rotor is rotationally driven hydraulically.

10. A method for preventing icing on a rotary separator in an internal combustion engine, the method comprising the steps of:
a) checking if the engine is switched off and if no, repeating this query at intervals until the response is yes;
b) starting a first timer that determines a time limit for implementing a solo-start routine for operating the rotary separator while the engine is switched off;
c) specifying a temperature limit value that indicates a risk of icing on the rotary separator;
d) detecting a temperature at or near the rotary separator;
e) if the temperature detected has reached the temperature limit value, starting a second timer that specifies a total time limit for the solo-start routine, starting a third timer that specifies a time period for cleaning a rotor, and starting a fourth timer that specifies a time period for cleaning the rotor;
f) determining if the second timer has timed out and, if yes, terminating the solo-start routine;
g) specifying a temperature gradient limit value;
h) if the second timer has not timed out, detecting the temperature again and calculating a temperature gradient;
i) determining if the temperature gradient is a negative value and below the temperature gradient limit value; and
j) if the temperature gradient is below the temperature gradient limit value, re-starting the fourth timer and repeating a solo-start and cleaning of the rotor, and if not below the temperature gradient limit value, terminating the solo-start routine.

11. The method of claim 10, the step d) further comprising the step of:
d1) if the temperature detected is not below the temperature limit, determining if the first timer has timed out and, if yes, terminating the solo-start routine, and if no, repeating step d).

12. A rotary separator in an internal combustion engine, adapted to operate independently of the internal combustion engine to prevent icing in/on the rotary separator, the rotary separator comprising:
a rotor that is rotationally driven; and
a control that is electronically coupled with the rotor and programmed to execute steps of a solo-start routine of the rotary separator;
wherein the solo-start routine queries whether the internal combustion engine is switched off and if no, repeats this query at intervals until the response is yes, and, when the response is yes, determines whether there is risk of icing and, if yes, initiates a solo start of the rotary separator that brings the rotor to a speed that effectively removes condensate from the rotor, the solo-start routine further specifying a time limit for initiating one or more solo starts after the engine is switched off, and suppressing solo starts after the time limit is reached.

* * * * *